United States Patent
Espe et al.

(10) Patent No.: US 11,346,204 B2
(45) Date of Patent: May 31, 2022

(54) TOOL, SYSTEM AND A METHOD FOR DETERMINING BARRIER AND MATERIAL QUALITY BEHIND MULTIPLE TUBULARS IN A HYDROCARBON WELLBORE

(71) Applicant: WELLGUARD AS, Tyssedal (NO)

(72) Inventors: Eirik Espe, Tyssedal (NO); Fridtjof Nyhavn, Trondheim (NO); Tonni Franke Johansen, Trondheim (NO)

(73) Assignee: Wellguard AS, Tyssedal (NO)

( * ) Notice: Subject to any disclaimer, the term of this patent is extended or adjusted under 35 U.S.C. 154(b) by 450 days.

(21) Appl. No.: 16/258,070

(22) Filed: Jan. 25, 2019

(65) Prior Publication Data

US 2019/0226319 A1 Jul. 25, 2019

(30) Foreign Application Priority Data

Jan. 25, 2018 (NO) .................................. 20180117

(51) Int. Cl.
*E21B 47/005* (2012.01)
*E21B 17/10* (2006.01)
(Continued)

(52) U.S. Cl.
CPC ............ *E21B 47/005* (2020.05); *E21B 17/10* (2013.01); *E21B 23/00* (2013.01); *G01V 1/282* (2013.01);
(Continued)

(58) Field of Classification Search
CPC ........ E21B 47/005; E21B 23/00; E21B 17/10; G01V 11/005; G01V 1/40; G01V 1/52; G01V 2001/526
See application file for complete search history.

(56) References Cited

U.S. PATENT DOCUMENTS 3,691,518 A 9/1972 Schuster
3,712,414 A * 1/1973 Crawford .............. E21B 47/005
340/853.3
(Continued)

FOREIGN PATENT DOCUMENTS

EP 3743598 12/2020
WO 2015050882 A1 3/2016

OTHER PUBLICATIONS

Norwegian Search Report dated Aug. 24, 2018 for Norwegian patent application No. 20180117, filed Jan. 25, 2018.
(Continued)

*Primary Examiner* — Ian J Lobo
(74) *Attorney, Agent, or Firm* — K&L Gates LLP

(57) ABSTRACT

A tool and a method for determining material quality of a hydrocarbon wellbore cross section, having one or more tubular elements having filling materials in between, is described. A tool includes a body and moveable assemblies, having multiple arms configured to be in contact with an inner wall of a downhole tubular element, that that are configured to move between a retracted position where the multiple arms of the moveable assemblies are within a housing located in the body of the tool and an extended position where the multiple arms of the moveable assemblies are protruding from the housing and are in contact with the inner wall of the downhole tubular element. The moveable assemblies comprise both an acoustic broad band source array that operates in the frequency range of 0-100 kHz and an acoustic broad band receiver array having a radially spaced acoustic broad band receiver.

8 Claims, 6 Drawing Sheets

(51) Int. Cl.
    *G01V 1/40*      (2006.01)
    *G01V 1/46*      (2006.01)
    *G01V 1/28*      (2006.01)
    *G01V 1/50*      (2006.01)
    *G01V 1/52*      (2006.01)
    *E21B 23/00*      (2006.01)
    *G01V 11/00*      (2006.01)
    *E21B 47/16*      (2006.01)
    *E21B 47/107*      (2012.01)

(52) U.S. Cl.
    CPC .................. *G01V 1/40* (2013.01); *G01V 1/46* (2013.01); *G01V 1/50* (2013.01); *G01V 1/52* (2013.01); *G01V 11/005* (2013.01); *E21B 47/107* (2020.05); *E21B 47/16* (2013.01); *E21B 2200/20* (2020.05); *G01V 2001/526* (2013.01); *G01V 2200/14* (2013.01); *G01V 2210/66* (2013.01)

(56) References Cited

U.S. PATENT DOCUMENTS

| | | | |
|---|---|---|---|
| RE31,607 E * | 6/1984 | Vogel | G01V 1/52 166/214 |
| 4,757,873 A * | 7/1988 | Linyaev | E21B 17/1021 181/105 |
| 4,800,537 A | 1/1989 | Mount, II | |
| 4,802,145 A * | 1/1989 | Mount, II | G01H 5/00 367/35 |
| 4,805,156 A * | 2/1989 | Attali | E21B 47/005 367/35 |
| 8,553,495 B2 | 10/2013 | Johnson et al. | |
| 9,142,752 B2 | 9/2015 | Lautzenhiser et al. | |
| 9,606,254 B2 | 3/2017 | Cheng et al. | |
| 10,364,664 B2 | 7/2019 | Hori et al. | |
| 2007/0107938 A1 | 5/2007 | Cornish et al. | |
| 2010/0157731 A1 | 6/2010 | Aeron et al. | |
| 2010/0263449 A1 | 10/2010 | Bolshakov et al. | |
| 2015/0281848 A1 | 10/2015 | Khajeh et al. | |
| 2017/0350231 A1 * | 12/2017 | Merciu | E21B 49/00 |
| 2018/0003843 A1 * | 1/2018 | Hori | G01V 1/44 |
| 2018/0100950 A1 | 4/2018 | Yao et al. | |
| 2018/0355712 A1 | 12/2018 | Nguyen et al. | |

OTHER PUBLICATIONS

International Search Report and Written Opinion dated Aug. 5, 2019 for related PCT App. No. PCT/NO2019/050019 filed Jan. 25, 2019, Aug. 5, 2019.

* cited by examiner

TOOL, SYSTEM AND A METHOD FOR DETERMINING BARRIER AND MATERIAL QUALITY BEHIND MULTIPLE TUBULARS IN A HYDROCARBON WELLBORE

FIELD OF THE INVENTION

The invention concerns the field of well logging. More specifically, the invention concerns a tool, system and a method for determining material quality of a hydrocarbon wellbore, as set out by the independent claims 1 and 6.

BACKGROUND OF THE INVENTION

Hydrocarbon fluids such as oil and natural gas are obtained from a subterranean geologic formation, referred to as a reservoir, by drilling a well that penetrates the hydrocarbon-bearing formation. Once a wellbore has been drilled, the well must be completed before hydrocarbons can be produced from the well. A completion involves the design, selection, and installation of equipment and materials in or around the wellbore for conveying; pumping, or controlling the production or injection of fluids.

Hydrocarbon fluids are normally produced by pressure depletion or by pressure maintenance by having water injection wells to push hydrocarbons towards a producing well by injecting water. Poor cement bonding between the cement and the casing, or the formation, channels, or fractures through the cement, may lead to hydrocarbon leakage to the surface and cause a blowout with severe damages to people, equipment and the environment.

During a wells lifetime, the well experience changes in pressure, changes in temperature, and various exposure to different corrosive fluids. In addition, some wells also experience subsidence of the formation in which they are located. These elements are some of the most obvious features that can cause changes to the cement properties and result in leakage of fluids through the cement or disconnection (debonding) from the steel casing or the formation.

Hydrocarbon wells are plugged and abandoned after they are depleted. Proper cement or barrier material quality evaluation behind the casing is therefore critical when planning for plug and abandonment. Because integrity of the barrier material or cement may have changed over time, evaluation of the material's quality is necessary when the wells are being plugged.

There are several different types of cement bond logging tools (CBL) and cement evaluation tools (CET) in the industry. These are either sonic tools or ultrasonic tools. CBL tools normally operate in the sonic frequency band, i.e. below 20 kHz. The basic tool configuration is composed of one transmitter and two receivers. The first receiver is typically located 3 feet from the transmitter and is used for CBL measurement. The second receiver may be located 5 feet from the transmitter and is used for Variable Density Log.

Radial CBL tools have later been developed to overcome some limitations of the early conventional CBL tools. These permit more accurate evaluation of cement distribution by providing the precise location of partial bond and channeling. Radial CBL tools use one or more azimuthally sensitive transducers to evaluate cement quality around the circumference of one casing. Other modern acoustic cement evaluation tools are comprised of one or more monopole (axisymmetric) transmitters and two or more receivers. They operate on the principle that acoustic amplitude is rapidly attenuated in good cement bond, but not in partial bonded or free pipe.

Modern acoustic cement evaluation tools measure:
Compressional wave travel time (transit time)
Amplitude (first pipe arrival)
Attenuation per unit distance Conventional CBL tools provide omnidirectional measurements, while newer radial cement evaluation tools provide azimuthally sensitive measurements for channel evaluation in the cement.

Borehole-compensated devices using dual transmitters and dual receivers were introduced in the 1980s, and today most commercial devices use multiple transmitters and receivers in a variety of arrangements to provide compensated measurements. These devices measure the attenuation between two transmitters and receivers as a way of eliminating, or at least minimizing, the effects of:
Tool eccentering
Fluid attenuation
Receiver sensitivity
Temperature drift
Calibration A longer spacing between the transmitter and the receiver, >5 feet, may be used for full waveform recording as this provides greater separation of the casing and formation signal arrival times. This separation allows for easier analysis of the formation signal strength and is used to monitor cement to formation bonding behind a single casing. These tools typically operate at higher frequencies than conventional tools, between 20 and 30 kHz. These tools also require centralization to ensure accurate measurements.

When the acoustic wave generated by the transmitter reaches the casing, the following happens;
Part is refracted down the casing (amplitude and travel time measurement)
Part travels through the mud (fluid arrival)
Other parts are refracted into the annulus and the formation and received back (formation arrival)

Amplitude measured directly or as an attenuation ratio, is the primary bond measurement and is used to provide:
Quantitative estimations of cement compressive strength
Bond index
Qualitative interpretation of the cement to formation interface CBL tools use gated systems to measure the specific parts of the acoustic waveform needed for the primary bond-amplitude measurement. Gates are time periods during which measurements are made, and they can be either:
Fixed
Floating Fixed gate systems are commonly used for amplitude measurements and floating gates for travel time measurements. Fixed gates are set, generally at the wellsite, to open, remain open, and to close at designated times. Opening time for the gate is a function of the casing size and the borehole fluid velocity. If the gate opening is too large, there may be interference between early and late arriving signals. Floating gates remain open, but recording is only triggered by an amplitude value greater than a designated threshold value.

Tool response depends on the acoustic impedance of the cement, which in turn is a function of density and velocity. Based on empirical data, the log can be calibrated directly in terms of cement compressive strength.

A typical cement log presentation includes:
A correlation curve (gamma ray), travel time ($\mu$sec)
Amplitude (mV)
Attenuation (dB/ft) curves
A full waveform display ($\mu$sec)

Presentation of the full acoustic waveform assists in resolving bond ambiguities arising from use on an amplitude measurement alone and provides qualitative information about the cement to formation bond. Waveform displays may be in:

Variable density or intensity formats
Oscilloscope waves

Data from these tools are presented as individual log curves or as azimuthal images of cement quality generated by interpolation between the individual azimuthal measurements. In addition, each tool design also provides a conventional 5-feet Variable Density Log waveform measurement to provide information about the cement to formation bond.

Ultrasonic tools are superior to the acoustic CBLs, although they remain adversely affected by highly attenuating muds. They are often grouped as "cement evaluation tools." One of the earlier ultrasonic tools was called the Cement Evaluation Tool (CET). This tool comprises an array of eight ultrasonic transducers that allow a limited radial inspection of the first casing and its annulus.

The most recent tools have a single rotating transducer that incorporates both the source and receiver of ultrasonic energy. The tool must be centralized in the well. The data for circumferential inspection of the casing, as described above, and for the evaluation of cement bonding are obtained on the same logging pass. Acoustic energy is reflected at interfaces that correspond to changes in acoustic impedance (the product of acoustic velocity and density). The first reflection is at the casing itself. The second reflection may be at the outside of the casing. If cement is bonded to the casing, there will be a strong reflection. If there is unset cement or water behind the casing, there will be a weak reflection. The received waveform is the sum of the reflected waveform from the original burst and the exponentially decaying waveform from the resonant energy that is trapped between the inner and outer edges of the casing. By analysing the entire waveform, an acoustic-impedance map of the cement can be constructed. This map can indicate the presence of channels and their orientations.

Ultrasonic Imager (USI™) is one such tool. It operates from 200 to 700 kHz and provides a full high-resolution coverage of the casing and cement integrity. Channels as narrow as 1.2 inches (30 mm) can be detected. The ultrasonic imager is traditionally used in combination with a conventional CBL tool. Essentially, the CBL reads low-amplitude values in gas-contaminated cements. The USI cannot distinguish between gas-filled cement and fluids, but it can quantify the acoustic impedance of the cement. The CBL and USI are used conjunctively to distinguish these cases. The application of statistical variance processing to the conjunctive use of CBL and ultrasonic impedance data has led to an improved cement evaluation.

Isolation Scanner is one of the newer cement evaluation tools in the industry. It uses one ultrasonic transducer for pulse echo measurement as well as one flexural wave transmitter and two receivers. This tool overcomes some of the limitations of evaluating newer cement types seen in other cement evaluation tools. The use of the flexural wave attenuation gives a better image of low impedance cements. The Isolation Scanner may also be used to measure the inside diameter and the thickness of the casing in which the tool is submerged.

Segmented Bond Tool (SBT™) uses six pads, on each of which there is a transducer arrangement of receivers and transmitters of acoustic energy. The pads are in contact with the casing. Energy is transmitted at one pad and is received at an adjacent pad. The pad spacing is such that the first arrival is the wave that has passed through the casing. The rate of attenuation can be computed across each 60° segment of the casing circumference.

Today's existing cement evaluation tools and technology for cement evaluation are limited to characterize cement behind only one casing wall. A tool that is able to evaluate material quality behind multiple casing from inside the production tubing would provide a tremendous cost saving with respect to diagnosing barrier integrity in annular spaces behind casings for wells that are planned plugged and abandoned such to avoid the pulling of tubulars. Existing cement evaluation tools also rely on a large degree of interpretation and calibration, often leading to contradicting results depending on the analyst, irrespective of the actual cement quality.

The aim of the present invention is to provide a tool, system and a method for determining barrier and material quality behind multiple tubulars from inside a production tubing in a downhole well.

SUMMARY

It is provided a tool for determining material quality of a hydrocarbon wellbore cross section, the hydrocarbon wellbore cross section comprising one or more tubular elements having filling materials in between, the tool comprising:

a body;

a plurality of moveable assemblies having multiple arms configured to be in contact with an inner wall of a downhole tubular element, wherein the plurality of the moveable assemblies are configured to move between a retracted position where the multiple arms of the plurality of the moveable assemblies are within a housing located in the body of the tool and an extended position where the multiple arms of the plurality of the moveable assemblies are protruding from the housing and are in contact with the inner wall of the downhole tubular element, wherein at least one of the plurality of moveable assemblies comprises an acoustic broad band source array that operates in the frequency range of 0-100 kHz and at least one or more of the plurality of moveable assemblies comprises an acoustic broad band receiver array comprising one or more radially spaced acoustic broad band receivers.

In one embodiment each of the multiple arms is made of foldable elements.

In one embodiment the tool further comprising an instrumentation means, wherein the instrumentation means comprises one or more telemetries, motor drivers, controllers, signal amplifiers, CPUs or memories.

In one embodiment the acoustic broad band source array comprises one or more acoustic broad band sources. In another embodiment the acoustic broad band array comprises four acoustic broad band sources where the sources are 90 degrees separated from one another. The acoustic broad band sources are arranged on the tips of the multiple arms. In one embodiment the acoustic broad band source array operates in the frequency range of 0-40 kHz. The acoustic broad band sources are preferably piezoelectric sources or magnetostrictive sources. The acoustic broad band source array is configured to enable eigenfrequencies in sonic and ultrasonic spectrum of a material behind the downhole tubular element by triggering a motion within the inner wall of the downhole tubular element. In one embodiment the acoustic broad band source array is configured to suppress and/or enhance $n^{th}$ order wave mode by applying different signals and/or phase swaps on the different acoustic broad band sources of the array. The $n^{th}$ order wave modes are between 0 and 20.

In one embodiment, the acoustic broad band receivers are arranged on the tips of the multiple arms. The acoustic broad band source array is in contact with the inner wall of the downhole tubular element. In one embodiment the acoustic broad band receiver array operates in the frequency range of 0-100 kHz. The acoustic broad band source array is configured to enable eigenfrequencies in sonic and ultrasonic spectrum of a material behind the downhole tubular element by triggering a motion within the inner wall of the downhole tubular element. In one embodiment the acoustic broad band receiver array is configured to measure the normal and/or tangential displacement of the trigged wave modes.

In one embodiment the downhole tubular element is a production tubing or an inner casing.

In one embodiment the tool is configured to obtain eigenfrequencies of the cross section of the hydrocarbon wellbore. In one embodiment the filling material is brine and/or cement, shale, salt, molten alloy or a polymer. In one embodiment the cross section further comprises a hydrocarbon bearing formation.

In one embodiment the instrumentation means is arranged in a compartment within the body of the tool or is separate unit arranged on a remote location.

It is also provided a method of determining material quality of a hydrocarbon wellbore cross section, the method comprising the steps of:
  conveying a tool in a downhole tubular, the tool comprising:
    a body; and
    a plurality of moveable assemblies having multiple arms, at least one of the plurality of the moveable assemblies comprising an acoustic broad band source array and at least one or more of the plurality of moveable assemblies comprising one or more acoustic broad band receiver array;
  extending the plurality of the moveable assemblies to bring them into contact with the inner wall of the downhole tubular element;
  activating one or more acoustic sources in said acoustic broad band source array in order to trigger wave modes on the inner wall of the downhole tubular to enable eigenfrequencies in sonic and ultrasonic spectrum of the cross section of the hydrocarbon wellbore with the acoustic broad band source array;
  recording wave modes excited on the inner wall of the downhole tubular with the acoustic broad band receiver array;
  determining eigenfrequencies of the excited wave modes;
  constructing a characteristic pattern of the eigenfrequencies of the excited wave modes; and
  comparing the constructed characteristic pattern with pre-stored models in a computer to determine the material quality.

In one embodiment the construction of the characteristic pattern of the excited wave modes involves frequency versus wavenumber analysis.

In one embodiment the pre-stored models in the computer comprise multiple simulated and/or empirical models. In one embodiment the pre-stored model are eigenfrequencies.

In one embodiment the method further comprises suppressing and/or enhancing $n^{th}$ order wave mode by applying different signals and/or phase swaps on the different acoustic broad band sources of the array.

It is also provided a system for determining material quality in a cross section of a hydrocarbon wellbore, the cross section comprising one or more tubular elements having filling materials in between, the system comprising;
  a memory unit having multiple pre-defined models of a hydrocarbon wellbore cross sections, wherein each of the multiple pre-defined models of the hydrocarbon cross sections has a unique eigenfrequency that represent measure of a bonding between the one or more tubular elements, the filling materials in between,
  a tool comprising;
    a body; and
    a plurality of moveable assemblies having multiple arms configured to be in contact with inner wall of a downhole tubular elements, wherein the plurality of the moveable assemblies are configured to move between a retracted position where the multiple arms are within a housing located in the body of the tool and an extended position where the multiple arms units are protruding from the housing and are in contact with the inner wall of the downhole tubular, wherein at least one of the plurality of moveable assemblies comprises an acoustic broad band source array that operates in the frequency range of 0-100 kHz and at least one or more of the plurality of moveable assemblies comprises an acoustic broad band receiver array comprising one or more radially spaced acoustic broad band receivers; and
  a processor in communication with the memory unit and arranged to receive measured data from the tool.

In one embodiment the processor is configured to process and determine eigenfrequencies of the measured data.

In one embodiment the system further comprises a display configured to show a characteristic pattern of the eigenfrequencies of the measured hydrocarbon wellbore cross section.

BRIEF DESCRIPTION OF THE DRAWINGS

These and other characteristics of the invention will become clear from the following description of a preferential form of embodiment, given as a non-restrictive example, with reference to the attached schematic drawings, wherein.

Figure 1:
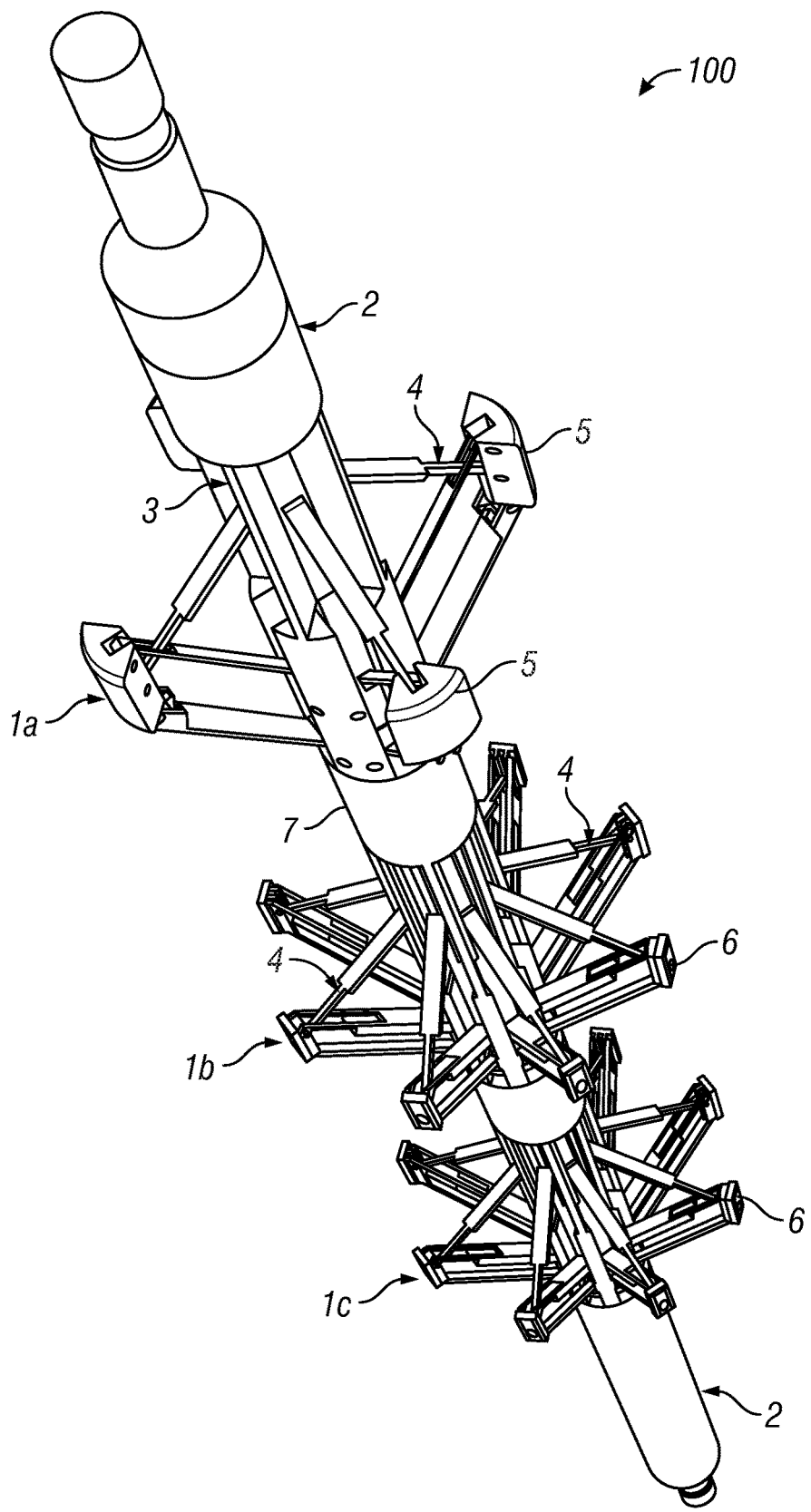
FIG. 1 shows the tool according to the invention.

DETAILED DESCRIPTION OF A
PREFERENTIAL EMBODIMENT

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the invention. The terms are used for the reader's convenience only and shall not be limiting.

FIG. 1 shows a tool 100 having a body 2. The tool 100 may include one or more moveable assemblies 1a, 1b, and 1c mounted in a housing 3 of the tool 100 and configured to be in contact with a production tubing or a casing. Each moveable assembly 1a,b,c may include multiple arms 4, and the multiple arms may include foldable elements 4 and may be configured to move from a retracted position where the foldable elements are folded and resting within the housing 3 to an extended position where the foldable elements are protruding from the housing 3 and beyond the outer surface of the tool body 2 of the tool 100. The multiple arms 4 of the moveable assembly 1a,b,c may be configured to be in contact with the inner wall of the production tubing or casing when in an extended position. At least one of the moveable assemblies may include at least one acoustic broad banded source array or at least one broad banded receiver array. The multiple arms may comprise slidable or collapsible elements instead of the foldable element or other elements suitable for the purpose.

In one embodiment, the moveable assembly 1a may comprise one broad banded source array (group). The broad banded source array may include at least four radially spaced broad banded sources 5. The sources of the broad banded source array may be mounted on the multiple arms of the moveable assembly 1a. Each source 5 is configured to trigger a broad acoustic signal ranging from 0 to 40 kilo Hertz. The sources are broad banded because of their ability to trigger a signal consisting of low frequencies and high frequencies. The source may also be configured to trigger acoustic frequencies higher than 40 kilo Hertz. Many different types of sources may be used, including but not limited to, piezoelectric sources and magnetostrictive sources.

The moveable assembly 1b or/and 1c may be configured to include broad banded acoustic receivers 6, meaning that the receivers 6 may be configured to detect both low frequency and high frequency signals trigged by the broad banded acoustic sources. Each moveable assembly 1b or/and 1c, may include a broad banded receiver array (group) where each broad banded receiver array may comprise a plurality, radially spaced broad banded acoustic receivers 6 and may be mounted at the tips of the multiple arms 4 of the moveable assembly 1b or/and 1c. Each broad banded receiver array may include 4-20 radially spaced receivers 6 in order to measure frequency modes propagating circumferentially in the inner wall of the production tubing or casing. The acoustic receivers 6 may be accelerometers or hydrophones (if the receiver is not in contact with the inner casing/tubing). The acoustic receivers 6 of an acoustic receiver array may be equally spaced or may be asymmetrically positioned relative to each other. The acoustic receivers 6 may be set up as multiple receiving arrays covering 360 degrees at various distances from at least one acoustic source.

The tool 100 may further comprise instrumentation means located in a housing compartment 7, the housing compartment may be a cylindrical. The instrumentation means may be telemetries, DCDCs, motor drivers, controllers, DSPs, memories, CPUs, ADCs, source driver and etc. The instrumentation means may be located in one housing compartment or several different housing compartments located along the length of the tool 100.

The moveable assemblies 1abc may be configured to ensure that the tool 100 is positioned in the center of the inner wall of the production tubing or casing. The tool 100 may comprise any number of moveable assemblies and each moveable assembly may comprise any number of arms depending on the utilized number of sources or receivers in an array.

In operation the tool 100 may be conveyed to an area of interest of a well using a wireline tool such as e-line or slick line or may be conveyed using coiled tubing or e-coil or similar. The moveable assemblies 1a, b, c are then moved from a retracted position to an extended position such that the tips of the multiple arms 4 are in at least partial contact with the inner wall structure of the production tubing or casing. The tips of the multiple arms of the moveable assembly 1a may be equipped with one or more broad banded source (s). By utilizing the one or more broad banded source(s) that are in at least partial contact with the inner wall of the production tubing or inner casing, elastic waves may be triggered on the inner wall of the tubing to trigger natural frequencies in at least part of inner wall of the tubing or the entire inner wall of the tubing, in a manner that at least part of the tubing structure or the entire tubing structure is set in motion. A natural frequency of a system is defined as the frequency at which a system tends to oscillate in the absence of any driving or damping force. The broad banded sources enable eigenfrequencies in both the sonic and ultrasonic spectrum to actuate. Eigenfrequencies of a system correspond to the natural frequencies when there are no damping forces, otherwise the eigenfrequencies of a system will be complex containing an imaginary component. Thus, the natural frequency is the real part of the Eigenfrequency.

After triggering the elastic waves on the inner wall structure of the production tubing or inner casing of a system comprising multiple tubulars and filing materials in between the multiple tubulars, then it is possible to measure the spatial frequency (wave number) and the triggered natural frequencies of the system through contact measurements on the inner wall of the production tubing or inner casing with one or more broad banded receiver arrays of the moveable assemblies 1b and 1c. The one or more receiver arrays enable measurement of the normal and/or tangential displacement on the inner surface of the inner wall structure. The spatial frequency is defined as a measure of the spatial frequency of a wave, and most commonly expressed in radians per unit distance. It is how often a wave repeats itself within a given distance. The spatial frequency is given as wave number:

$$k = \frac{2\pi}{\lambda}$$

Figure 2:
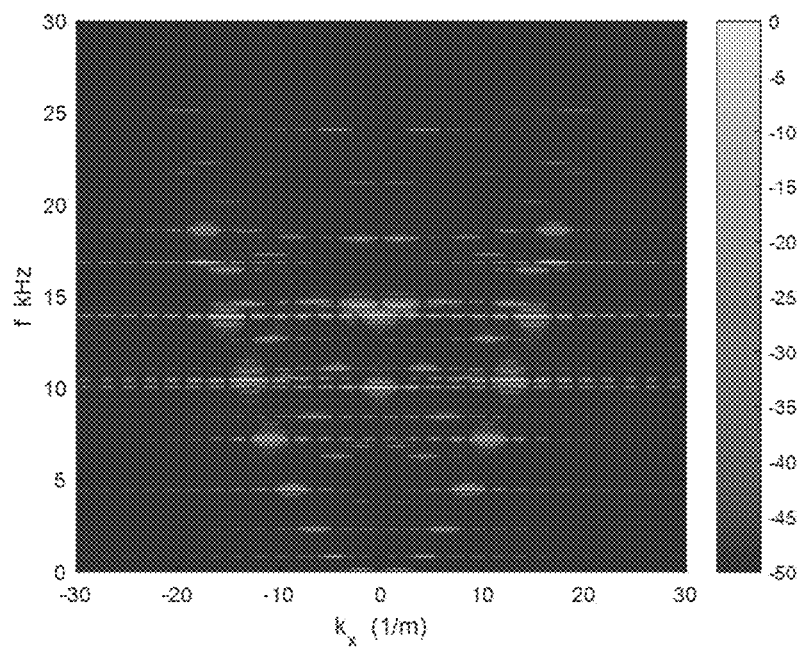
FIG. 2 shows characteristic pattern of the measured system.

The resulting measurement is a characteristic pattern for the type of system that is measured. Each system may have a unique pattern dependent on the degree of the bonding between the tubulars and the filling materials, type of the filing material, etc. The resulting measurements may for example be plotted in a k versus f diagram to obtain the system characteristic pattern as illustrated in FIG. 2. The different bright spots in FIG. 2 show all wave modes appearing in the system. This characteristic pattern is unique for each system that is investigated. Wave propagation speed is dependent on the frequency of the propagating wave. This can for example be observed in water waves (at deep water) where waves with lower frequencies travel faster, which is caused by gravitational waves. How a wave propagates and if it is dispersive depends on the medium and its restoration forces. Investigation of wave propagation reveals the structural composition of the acoustic media. If one looks at propagation of acoustic waves in a ring system, one can observe that the acoustic waves have a certain number of peaks around the circumference, and they propagate with $n^{th}$ order as illustrated in the FIG. 4. This is referred as wave modes.

Investigation of wave propagation can reveal the structural composition of the acoustic media it is traveling through, and that an attribute of dispersion analysis can reveal characteristic pattern of inaccessible regions. Such regions may be areas of interest in hydrocarbon wells, preferably annular spaces, fills between steel tubulars or integrity of the steel itself.

It is found that a system with steel rings, such as production tubing and casings, with various fills between the rings may have a multiple of eigenfrequencies existing in a broad band of frequencies, ranging from 0 kHz to over 40 kHz. Depending on the ring structure, characteristics such as material fill, ring diameter, ring thickness, bonding between materials, etc., there may be several eigenfrequencies with corresponding wave number and wave mode. The system eigenfrequency may be triggered by the broad banded acoustic source array and then characterized by its frequency, wave number and wave mode. The triggered elastic waves in the system propagate as displacements occurring at various locations in the system, of which is detected through contact measurements with the broad banded acoustic receiver arrays on the inner wall of the steel structure. The measured data may then be processed and characteristic pattern recognition is carried out to determine the properties of the system under investigation.

Figure 3A:
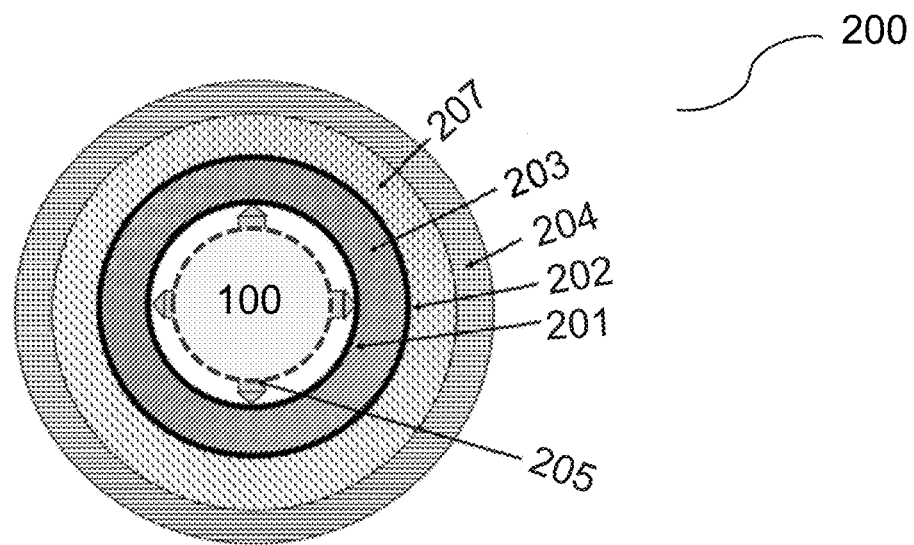
FIGS. 3a and 3b show an overview of a simplified hydrocarbon wellbore system.
Figure 3B:
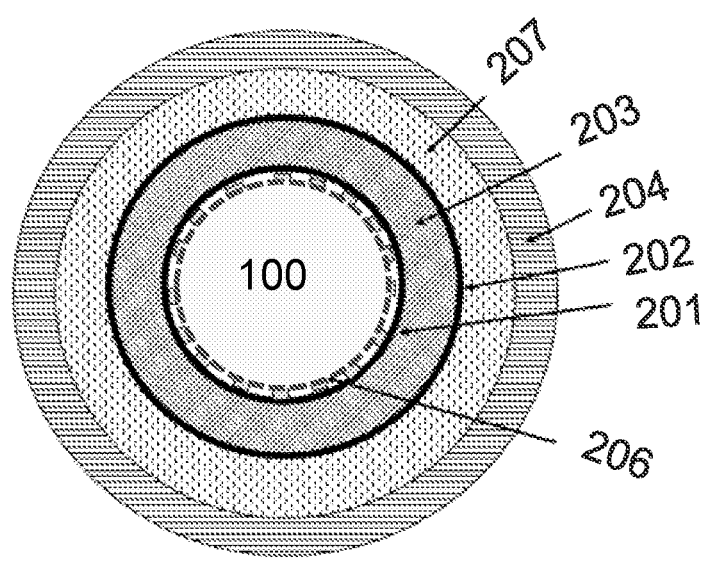

FIGS. 3a and 3b show an overview of a simplified hydrocarbon wellbore system 200. The system 200 in FIGS. 3a and 3b comprises tool 100 conveyed in the hydrocarbon wellbore system 200. The tool 100 includes arms 205, 206 extended towards and in contact with a production tubing 201. Each arm 205 in FIG. 3a is equipped with a broad banded source. In FIG. 3a four radially spaced broad banded sources are utilized. The arms 206 are equipped with broad banded receivers. In FIG. 3b multiple radially spaced broad banded receivers are utilized, however this shall not be limiting. The sources and receivers are in contact with the inner part of the production tubing 201. The reservoir system 200 comprises a casing 202 installed at a distance from the production tubing 201, an annulus 203 is defined in between the production tubing 201 and the casing 202. This annulus 203 may be occupied by well completion fluids, such as brine. The casing 202 is installed adjacent to a formation 204. The space in between the casing 202 and the formation 204 may be filled with a fill material 207, such as cement.

Figure 4:
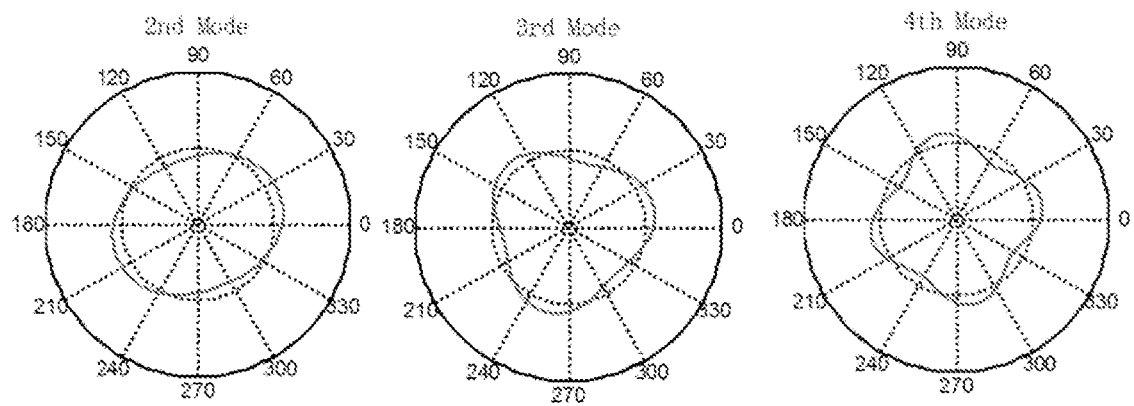
FIG. 4 shows a plot of the wave modes.
Figure 5A:
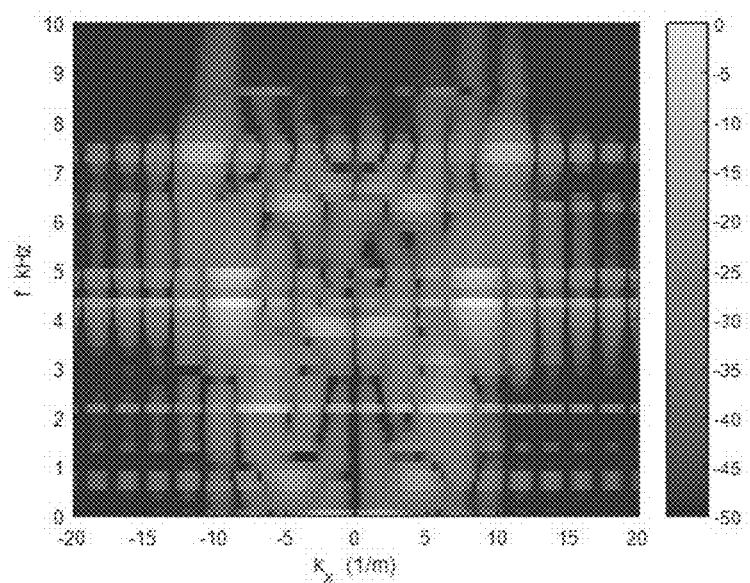
FIGS. 5a and 5b show a plot of the eigenfrequencies of the measured data in frequency versus wavenumber domain.
Figure 5B:
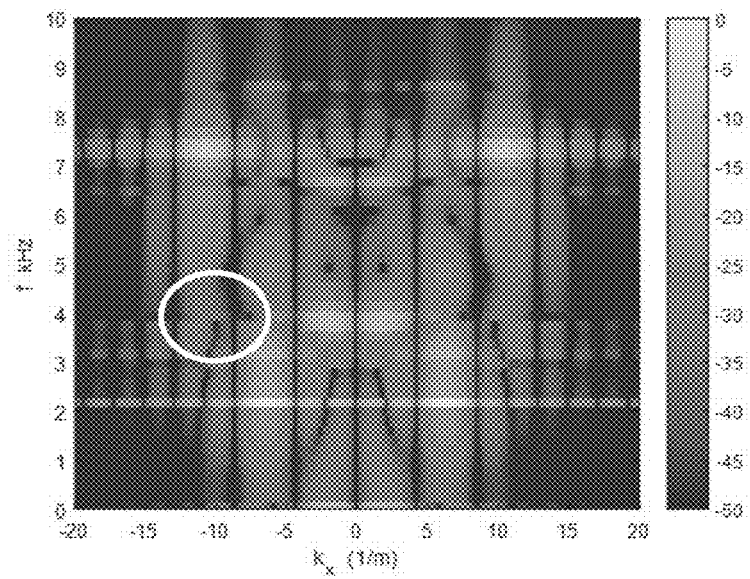

One advantage of utilizing abroad banded source array with two or more sources in the system shown in FIGS. 3a and 3b may be the flexibility of suppressing or enhancing different wave modes of interest. This can be done by applying different signals or phase swaps on the different sources to enhance or suppress different modes of interest. As an example, only two sources may be activated, where a first source is at 0° and a second source is at 180° relative the first source along the circumference of the inner wall of the production tubing 201 or the inner casing 202 in cases where the production tubing is removed. The first and the second source may be configured to trigger elastic waves on the inner wall of the steel structure with similar signals, but in opposite phase compared to one another. After the utilization of the first and the second sources, the propagating waves are recorded, processed and the eigenfrequencies of system 200 is determined. By analysing the result, it is observed that the odd orders of the wave modes are enhance while the even orders of the wave modes are suppressed. FIG. 4 shows a plot of the $2^{nd}$, $3^{rd}$ and $4^{th}$ order wave modes. A plot of eigenfrequency of the system 200 is shown in FIGS. 5a and 5b in frequency versus wavenumber domain (f-k domain). FIG. 5a shows all the wave modes of the system 200 at frequency between 0 and 10 kHz and FIG. 5b shows that even modes are suppressed at frequency between 0 and 10 kHz.

All the four sources of the source array may be activated simultaneously, where the sources may be separated 90° from each other. By recording the motion and calculating the eigenfrequencies of the system one can observe that fourth order wave modes of the system are excited. A system where the annulus 203 defined in between the production tubing 201 and the casing 202 is occupied by water and where the annulus 207 defined between the casing 202 and the formation 204 is filled with cement which is bonded to the casing will have a different eigenfrequency compared to a system where the cement in annulus 207 is fully or partly de-bonded from the casing 202. Bonding and de-bonding terms are meant by whether or not the fill material such as cement is fixed or attached to its surroundings. A system with a poor fill material may have cracks, fractures, channels, voids or other types of wear in between the fill material or at the interface between the fill material and the casing or the production tubing or the formation. The fractures, cracks, voids or channels may be axial or radial and may be continuous or discontinuous along the length of the casing/production tubing. Wave mode enhancement may be used to determine the quality of the fill material behind the casing 202 with the tool 100 positioned in the production tubing 201. Wave mode enhancement can also be used to determine the quality of the fill material behind multiple casing with the tool 100 positioned in the production tubing 201. Furthermore, the same results may be achieved by positioning the tool in the inner casing for the cases where the production tubing is removed or not available.

The sources may also be used to excite modes dominated by shear to determine bonding of fill material to the formation or casing. The term excited modes is meant by waves that are propagating circumferentially in the tubular elements, in which the motion is triggered by the sources and recorded by the receivers.

Powerful broad banded sources in contact with the casing/tubing wall in operation result in the production/casing wall acting as a speaker membrane.

Figure 6:
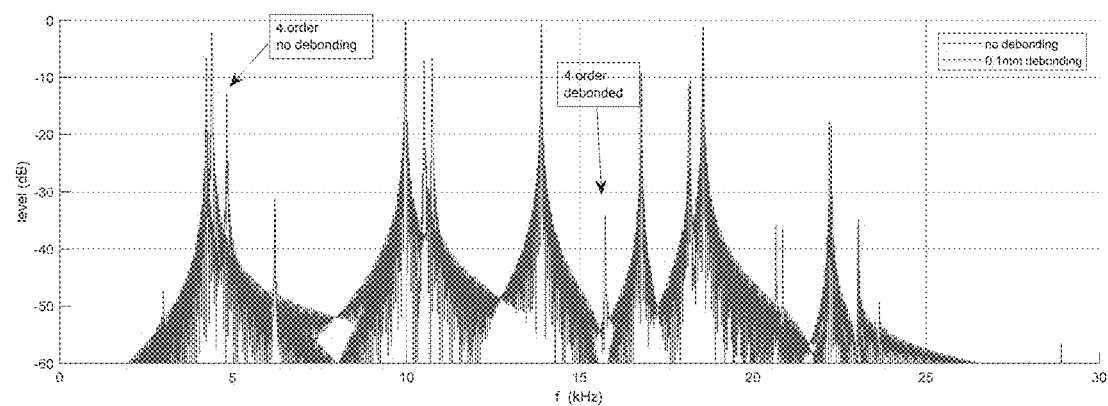
FIG. 6 shows amplitudes of the $4^{th}$ order wave mode of a system where fill material in the second annulus is cement.
Figure 7:
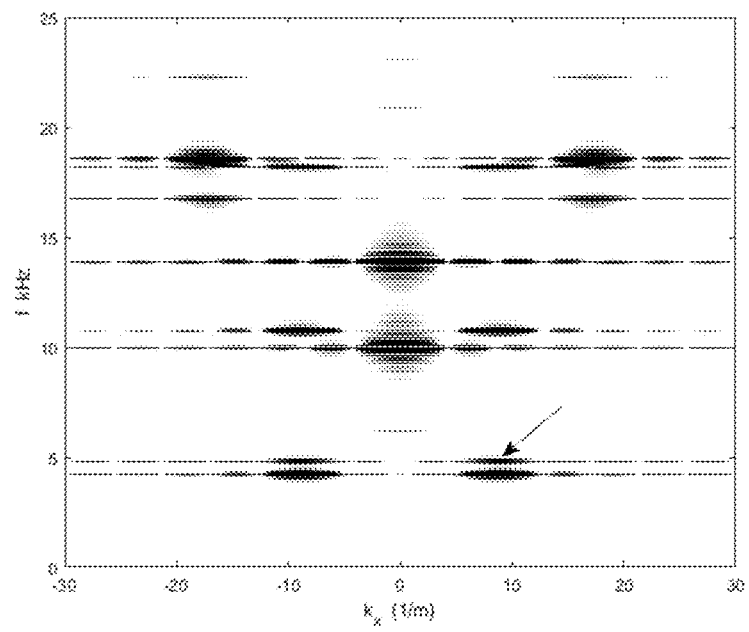
FIG. 7 and FIG. 8 show plots of the results shown in FIG. 6 in frequency versus wavenumber.
Figure 8:
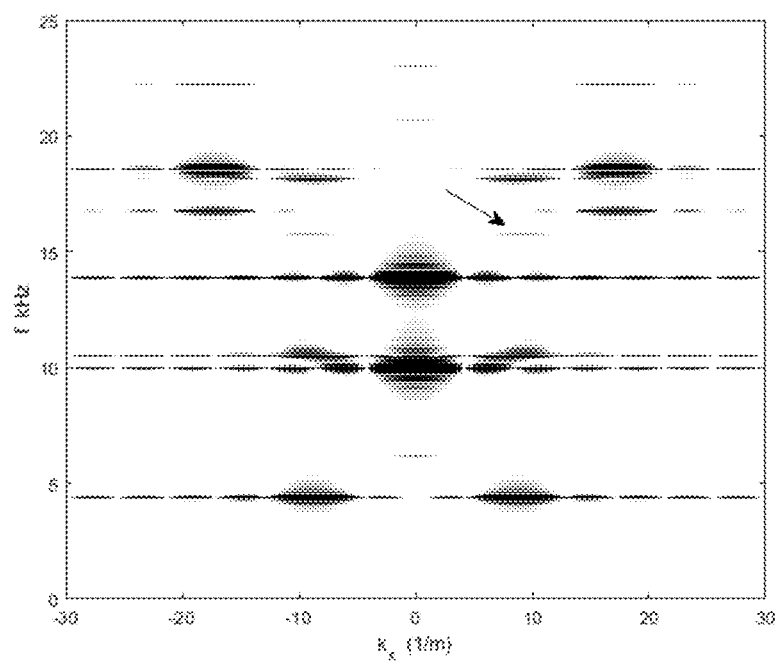

It is found that a system comprising water in the first annulus 203 and cement in the second annulus 207 has an eigenfrequency characteristic peak of a round 5 kHz, and the same system with de-bonding (poor bonding) has an eigenfrequency characteristic peak of a round 16 kHz, when the eigenfrequency of the system is plotted in spatial wavenumber versus frequency domain. This is illustrated in FIG. 6-8. FIG. 6 shows amplitudes of the $4^{th}$ order wave mode of the inner ring of the system where the cement in the second annulus is securely bonded to the casing 202 (blue line) and where the cement in the second annulus is de-boded with a gap of 0.1 mm between the cement and the casing 202. FIGS. 7 and 8 show plots of the results shown in FIG. 6 in frequency versus wavenumber. It is clear from FIGS. 7 and 8 that the bonded system in the second annulus has an eigenfrequency characteristic peak of a round 5 kHz and the de-bonded system in the second annulus has an eigenfrequency characteristic peak at around 16 kHz. The results may also be presented in a velocity versus frequency plot.

Another way of utilizing of the sources may be utilizing a broad signal to trigger all wave modes in the ring structure, or as a sweep increasing the frequency from 0 kHz to over 20 kHz. Then, after measuring spatial frequency of all waves modes, specific modes may be excited by altering the signal by reducing its signal width and/or shifting the center frequency to a frequency specific for a certain wave mode to enhance mode detection.

Sources may also be used to obtain information regarding fill material integrity with a modulated signal consisting of a low frequency and a high frequency signal.

To determine the characteristic pattern of the measured system, the plotted frequency versus wavenumber of the measured system may be compared to pre-stored models in a computer. The pre-stored models may be multiple simulated models or multiple empirical models measured in a laboratory. Pattern recognition may be performed using the computer which compares the measured data of the system to the pre-stored models stored in the computer. If the computer finds a pre-stored model that fits the measured data, then the computer may show the pre-stored model that fits the measured data on a screen. The computer may also give information about the quality of the bonding. Computer may be on a remote location from the tool 100, or may be part of the instrumentation means of the tool 100. If the computer is not able to find a pre-stored model that fits the measured model, then experts may analyse the data and construct diagnostic characteristic pattern of the system and then update the pre-stored models in the computer.

It is thus provided a tool for determining material quality of a hydrocarbon wellbore cross section, the hydrocarbon wellbore cross section comprising one or more tubular elements having filling materials in between, the tool comprising:
  a body; and
  a plurality of moveable assemblies having multiple arms configured to be in contact with an inner wall of a downhole tubular element, wherein the plurality of the moveable assemblies are configured to move between a retracted position where the multiple arms of the plurality of the moveable assemblies are within a housing located in the body of the tool and an extended position where the multiple arms of the plurality of the moveable assemblies are protruding from the housing and are in contact with the inner wall of the downhole tubular element, wherein at least one of the plurality of moveable assemblies comprises an acoustic broad band source array that operates in the frequency range of 0-100 kHz and at least one or more of the plurality of moveable assemblies comprises an acoustic broad band receiver array comprising one or more radially spaced acoustic broad band receivers.

In one embodiment each of the multiple arms is made of foldable elements.

In one embodiment the tool further comprising an instrumentation means, wherein the instrumentation means comprises one or more telemetries, motor drivers, controllers, signal amplifiers, CPUs or memories.

In one embodiment the acoustic broad band source array comprises one or more acoustic broad band sources. In another embodiment the acoustic broad band array comprises four acoustic broad band sources where the sources are 90 degrees separated from one another. The acoustic broad band sources are arranged on the tips of the multiple arms. In one embodiment the acoustic broad band source array operates in the frequency range of 0-40 kHz. The acoustic broad band sources are preferably piezoelectric sources or magnetostrictive sources. The acoustic broad band source array is configured to enable eigenfrequencies in sonic and ultrasonic spectrum of a material behind the downhole tubular element by triggering a motion within the inner wall of the downhole tubular element. In one embodiment the acoustic broad band source array is configured to suppress and/or enhance $n^{th}$ order wave mode by applying different signals and/or phase swaps on the different acoustic broad band sources of the array. The $n^{th}$ order wave modes are between 0 and 20.

In one embodiment, the acoustic broad band receivers are arranged on the tips of the multiple arms. The acoustic broad band source array is in contact with the inner wall of the downhole tubular element. In one embodiment the acoustic broad band receiver array operates in the frequency range of 0-100 kHz. The acoustic broad band source array is configured to enable eigenfrequencies in sonic and ultrasonic spectrum of a material behind the downhole tubular element by triggering a motion within the inner wall of the downhole tubular element. In one embodiment the acoustic broad band receiver array is configured to measure the normal and/or tangential displacement of the trigged wave modes.

In one embodiment the downhole tubular element is a production tubing or an inner casing.

In one embodiment the tool is configured to obtain eigenfrequencies of the cross section of the hydrocarbon wellbore. In one embodiment the filling material is brine and/or cement. In one embodiment the cross section further comprises a hydrocarbon bearing formation.

In one embodiment the instrumentation means is arranged in a compartment within the body of the tool or is separate unit arranged on a remote location.

It is also provided a method of determining material quality of a hydrocarbon wellbore cross section, the method comprising the steps of:
  conveying a tool in a downhole tubular, the tool comprising:
    a body; and
    a plurality of moveable assemblies having multiple arms, at least one of the plurality of the moveable assemblies comprising an acoustic broad band source array and at least one or more of the plurality of moveable assemblies comprising one or more acoustic broad band receiver array;
  extending the plurality of the moveable assemblies to bring them into contact with the inner wall of the downhole tubular element;
  activating one or more acoustic sources in said acoustic broad band source array in order to trigger wave modes on the inner wall of the downhole tubular to enable eigenfrequencies in sonic and ultrasonic spectrum of the cross section of the hydrocarbon wellbore with the acoustic broad band source array;
  recording wave modes excited on the inner wall of the downhole tubular with the acoustic broad band receiver array;
  determining eigenfrequencies of the excited wave modes;
  constructing a characteristic pattern of the eigenfrequencies of the excited wave modes; and
  comparing the constructed characteristic pattern with pre-stored models in a computer to determine the material quality.

In one embodiment the construction of the characteristic pattern of the excited wave modes involves frequency versus wavenumber analysis.

In one embodiment the pre-stored models in the computer comprise multiple simulated and/or empirical models. In one embodiment the pre-stored model are eigenfrequencies.

In one embodiment the method further comprises suppressing and/or enhancing $n^{th}$ order wave mode by applying different signals and/or phase swaps on the different acoustic broad band sources of the array.

It is also provided a system for determining material quality in a cross section of a hydrocarbon wellbore, the cross section comprising one or more tubular elements having filling materials in between, the system comprising;

A memory unit having multiple pre-defined models of a hydrocarbon wellbore cross sections, wherein each of the multiple pre-defined models of the hydrocarbon cross sections has a unique eigenfrequency that represent measure of a bonding between the one or more tubular elements and the filling materials in between, a tool comprising;
  a body;
  a plurality of moveable assemblies having multiple arms configured to be in contact with inner wall of a downhole tubular elements, wherein the plurality of the moveable assemblies are configured to move between a retracted position where the multiple arms are within a housing located in the body of the tool and an extended position where the multiple arms units are protruding from the housing and are in contact with the inner wall of the downhole tubular, wherein at least one of the plurality of moveable assemblies comprises an acoustic broad band source array that operates in the frequency range of 0-100 kHz and at least one or more of the plurality of moveable assemblies comprises an acoustic broad band receiver array comprising one or more radially spaced acoustic broad band receivers; and
  a processor in communication with the memory unit and arranged to receive measured data from the tool.

In one embodiment the processor is configured to process and determine eigenfrequencies of the measured data.

In one embodiment the system further comprises a display configured to show a characteristic pattern of the eigenfrequencies of the measured hydrocarbon wellbore cross section.

While the invention has been described with reference to the illustrated embodiment, it should be understood that modifications and/or additions can be made to the tool, but these shall remain within the field and scope of the invention.

What is claimed is:

1. A method of determining material quality of a hydrocarbon wellbore cross section, the method comprising the steps of:
  conveying a tool in a downhole tubular, the tool comprising:
    a body;
    a plurality of moveable assemblies having multiple arms, at least one of the plurality of the moveable assemblies comprising an acoustic broad band source array and at least one or more of the plurality of moveable assemblies comprising one or more acoustic broad band receiver array;
  extending the plurality of the moveable assemblies to bring them into contact with the inner wall of the downhole tubular;
  activating one or more acoustic sources in said acoustic broad band source array in order to trigger wave modes on the inner wall of the downhole tubular to enable eigenfrequencies in sonic and ultrasonic spectrum of the cross section of the hydrocarbon wellbore with the acoustic broad band source array;
  recording wave modes excited on the inner wall of the downhole tubular with the acoustic broad band receiver array;
  determining eigenfrequencies of the recorded wave modes;
  constructing a characteristic pattern of the eigenfrequencies of the recorded wave modes;
  comparing the constructed characteristic pattern with pre-stored models in a computer to determine the material quality.

2. The method according to claim 1, wherein the construction of the characteristic pattern of the recorded wave modes involves frequency versus wavenumber analysis.

3. The method according to claim 1, wherein the pre-stored models in the computer comprise multiple simulated and/or empirical models.

4. The method according to claim 1, wherein the method further comprises suppressing and/or enhancing $n^{th}$ order wave mode by applying different signals and/or phase swaps on the different acoustic broad band sources of the array.

5. The method according to claim 1 or 3, wherein the pre-stored models are eigenfrequencies.

6. A system for determining material quality in a cross section of a hydrocarbon wellbore, the cross section comprising one or more tubular elements having filling materials in between, the system comprising;
  a memory unit having multiple pre-defined models of a hydrocarbon wellbore cross sections, wherein each of the multiple pre-defined models of the hydrocarbon cross sections has a unique eigenfrequency that represent measure of a bonding between the one or more tubular elements and the filling materials in between,
  a tool comprising;
    a body;
    a plurality of moveable assemblies having multiple arms configured to be in contact with inner wall of a downhole tubular elements, wherein the plurality of the moveable assemblies are configured to move between a retracted position where the multiple arms are within a housing located in the body of the tool and an extended position where the multiple arms units are protruding from the housing and are in contact with the inner wall of the downhole tubular, wherein at least one of the plurality of moveable assemblies comprises an acoustic broad band source array that operates in the frequency range of 0-100 kHz and at least one or more of the plurality of moveable assemblies comprises an acoustic broad band receiver array comprising one or more radially spaced acoustic broad band receivers operable to measure data; and
  a processor in communication with the memory unit and arranged to receive the measured data from the tool.

7. The system according to claim 6, wherein the processor is configured to process and determine eigenfrequencies of the measured data.

8. The system according to claim 6, wherein the measured data comprises a measured hydrocarbon wellbore cross section and the system further comprises a display configured to show a characteristic pattern of the eigenfrequencies of the measured hydrocarbon wellbore cross section.

* * * * *